(12) United States Patent
Pfaff (10) Patent No.: US 9,138,012 B2
(45) Date of Patent: Sep. 22, 2015

(54) APPARATUS FOR CULTURING PLANT MATERIALS AS FOOD PRODUCT

(71) Applicant: Gunter Pfaff, Port Hueneme, CA (US)

(72) Inventor: Gunter Pfaff, Port Hueneme, CA (US)

(73) Assignee: Betsy's Tempeh Consulting, LLC, Port Hueneme, CA (US)

( * ) Notice: Subject to any disclaimer, the term of this patent is extended or adjusted under 35 U.S.C. 154(b) by 0 days.

(21) Appl. No.: 14/249,265

(22) Filed: Apr. 9, 2014

(65) Prior Publication Data

US 2014/0216275 A1     Aug. 7, 2014

Related U.S. Application Data

(63) Continuation-in-part of application No. 13/421,536, filed on Mar. 15, 2012, now abandoned.

(60) Provisional application No. 61/467,854, filed on Mar. 25, 2011.

(51) Int. Cl.
*F27D 11/00*     (2006.01)
*A23C 3/02*     (2006.01)
*A23L 1/20*     (2006.01)

(52) U.S. Cl.
CPC ................... *A23L 1/2008* (2013.01)

(58) Field of Classification Search
CPC ......... A47J 27/10; A47J 27/12; A47J 27/122; A23L 1/2008; A23L 1/2118; A23L 1/2111
USPC ................. 99/473, 474, 468, 467, 470, 453; 219/439, 441, 476–478, 483, 490
See application file for complete search history.

(56) References Cited

U.S. PATENT DOCUMENTS

| | | | |
|---|---|---|---|
| 5,686,004 A | 11/1997 | Schneider | |
| 2005/0133503 A1 | 6/2005 | Kim et al. | |
| 2008/0257172 A1 | 10/2008 | Duckworth et al. | |
| 2013/0334197 A1 | 12/2013 | Kim et al. | |

FOREIGN PATENT DOCUMENTS

| | | | | |
|---|---|---|---|---|
| JP | 59120069 A | * | 7/1984 | ............... A23L 1/20 |
| JP | 63301766 A | * | 12/1988 | ............... A23L 1/20 |
| JP | 07194333 A | * | 8/1995 | ............... A23L 1/20 |
| KR | 20060131423 | * | 12/2006 | ............... F25D 11/00 |
| KR | 20070005382 | * | 1/2007 | ............... A23B 7/10 |

OTHER PUBLICATIONS

International Search Report and Written Opinion from Appl No. PCT/US2015/025187. dated Jul. 6. 2015.

* cited by examiner

*Primary Examiner* — Tu B Hoang
*Assistant Examiner* — Alba Rosario-Aponte
(74) *Attorney, Agent, or Firm* — Koppel, Patrick, Heybl & Philpott (57) ABSTRACT

The invention is directed to an apparatus adapted to prepare a cultured food product, such as but not limited to tempeh, from a plant material. The apparatus comprises a housing, a container and at least one heating element. The container holds the plant material, such as a soyfood substrate, and is incubated in the housing whereby the cultured food product, such as a tempeh, is formed. The housing further comprises a controlled airflow wherein the housing is adapted to allow ambient air to flow into and out of the housing during the culturing process.

20 Claims, 5 Drawing Sheets

APPARATUS FOR CULTURING PLANT MATERIALS AS FOOD PRODUCT

RELATED APPLICATION

This application is a continuation in part application of Ser. No. 13/421,536 to Pfaff, filed on Mar. 15, 2012, which claims the benefit of priority of U.S. Provisional Application Ser. No. 61/467,854 to Pfaff, filed on Mar. 25, 2011. The contents of Ser. Nos. 13/421,536 and 61/467,854, including the drawings, schematics, diagrams and written description, are hereby incorporated in their entirety by reference.

BACKGROUND OF THE INVENTION

1. Field of the Invention

This invention relates to an apparatus for preparing a cultured food product, such as but not limited to tempeh, from a plant material.

2. Description of the Related Art

Tempeh has been a valuable and important food product which is traditionally prepared by fermenting and culturing whole dehulled soybeans or soybean grits or meal with cultures of beneficial fungi or microorganisms. Although tempeh is made from soy, it has a unique taste and is mildly flavorful on its own, unlike tofu, and also has different nutritional characteristics and textual qualities. Tempeh's fermentation process and its retention of the whole bean give it a higher content of protein, dietary fiber, and vitamins. It has a firm texture and an earthy flavor which becomes more pronounced as the tempeh ages. Because of its nutritional value, tempeh is used worldwide in vegetarian cuisine; some consider it to be a meat analogue.

Tempeh has traditionally been prepared by first soaking whole soybeans in water. The soaked, wet soybeans are then dehulled and boiled in water to soften the beans and destroy any contaminating microorganisms. The cooked soybeans are then spread out in thin layers to allow the water to drain and evaporate from the surface of the soybeans. The air dried soybeans are then mixed with a starter comprising portions of old tempeh containing a mixture of molds, bacterial and other microorganisms. The moist inoculated soybeans are then wrapped tightly and the material is allowed to culture at room temperature until the soybeans are completely molded. This product is known as tempeh, which can be eaten as is or sliced into thin slices, dipped into a salt solution and fried in a vegetable oil. Currently, tempeh can be made by soaking the beans or legumes and then boiling them until soft and antinutritional components have been eliminated or diminished. They are then dried off and sliced in a vegetable slicer (with skins). Then the tempeh starter culture is added and mixed into the substrate, after which it is ready for incubation. Commonly, tempeh is pasteurized after incubation.

The culturing of soybeans destroys the bad odor and bad flavor of soybeans by causing the microorganisms to produce enzymes that act on the proteins, carbohydrates and the oil in the soybeans to make the tempeh palatable and nutritious and to give a desirable flavor. Examples of microorganisms used in tempeh culturing are *Rhizopus oryzae* and *Aspergillus oryzae*; most often: *Rhizopus Oligosporus*. These microorganisms require aeration for growth and the formation of enzymes. During the culturing process, the soybeans must be spread out in layers that are relatively shallow in depth, due to the microorganisms used in making tempeh being aerobic. Resultantly, this means that the area of the soybean layers must be large.

The use of large area trays is common for commercial production of tempeh. Martinelli and Hesseltine (1964) Food Technology, Vol. 18, No. 5 found that large metal trays were excellent for commercial tempeh production because they were more sanitary and allowed for easier removal of the tempeh from the container in comparison to wooden trays (unless the wooden trays were lined with perforated plastic sheeting). The metal trays were reported to be preferably large aluminum trays instead of large stainless steel trays. However, the use of aluminum in prolonged contact with food is being questioned in relation to its possible implication in causing diseases, such as Alzheimers. Stainless steel is not a very good heat conductor and has less than 10 percent of the thermal conductivity of aluminum. In some instances, using stainless steel can result in a build-up of heat at the center of the tray which can cause spoilage of the tempeh in the area around the center of the tray.

A common practice in the preparation of tempeh is to cover the soybean layer with a film. The use of banana leaves in place of the film is a traditional method but can cause contamination, and the banana leaves are not reusable. Other films that can be used are polyethylene film or wax paper.

A common method of making tempeh consists of incubating a layer of soybeans covered with a flexible plastic sheet modified with aeration perforations. The incubation process takes place in an incubation room having an agitated airflow that is uniformly heated or cooled and with a consistent humidity. A disadvantage with the common method is that agitation of the airflow often leads to blackened areas on the tempeh where the airflow meets the microorganisms at the perforated holes. This contact with the fast moving airflow causes the microorganisms to sporulate prematurely and produces undesirable black spores. The greater the agitation of the airflow to ensure that the air in the incubation room does not stratify, the greater the occurrences of premature sporulation. Furthermore, it can be difficult to accurately control the humidity in the incubation rooms. If the airflow is slightly drier than optimum, the black spore problem is increased.

U.S. Pat. No. 3,228,773 to Hesseltine et al describes a method of preparing tempeh by fermenting soybeans with certain phycomycetous fungi of the order Mucorales, genus *Rhizopus*. The soybeans are soaked overnight, the seed coats are removed and the whole soybeans may be cracked into large grits. The soybeans are then softened and moistened by soaking in water and then boiled to sterilize and further soften the soybeans. Excess water is drained and the soybeans are cooled below 104° F. (40° C.) and then inoculated with a spore suspension of *Rhizopus* spores. The soybeans are cultured in conventional non-toxic plastic bags modified by the presence of 0.02 inch diameter perforations located not over 0.5 inches apart. The soybeans are also described as being cultured in perforated flexible, plastic tubing having a diameter of 3.5 inches (9 cm). In either example, the resulting tempeh must be removed from the plastic container and then cooked to prepare the tempeh as a consumable food.

U.S. Pat. No. 5,228,396 to Pfaff describes an apparatus for culturing plant materials as food, such as tempeh, wherein the apparatus comprises at least a container, such as a stainless steel tray, holding a plant material partially immersed in a water bath, and a cover covering the container. A heater heats the water bath such that the water bath evenly distributes the heat to the container, thereby allowing the plant material to be uniformly cultured. Regulation of the temperature of the water bath is done by increasing the heat of the heater or by adding cold water to the water bath.

SUMMARY

The invention provides various embodiments of an apparatus adapted to prepare a cultured food product, such as but not limited to tempeh, from a plant material. The invention is configured to be efficient, reliable, cost effective and can be used to prepare tempeh in large or small scale applications. The different embodiments comprise elements to alter or control the temperature during the culturing process. The elements can comprise many different materials or devices arranged in different ways, with some devices comprising a heating coil.

In one embodiment, as broadly described herein, an apparatus comprises a housing including a chamber, a container received by the chamber, and at least one heating element. The apparatus further comprises a plurality of inlet holes and a plurality of outlet holes, wherein air enters the chamber through the plurality of inlet holes and air exits the chamber through the plurality of outlet holes. The at least one heating element is configured to regulate and alter the temperature inside the apparatus to ensure that the temperature inside the apparatus is at the desired level.

In another embodiment, the apparatus comprises a housing including a top portion and a bottom portion, a support structure, a container received by the support structure and at least one heating zone adjacent the container. The apparatus can further comprise a control mechanism adapted to operate the apparatus during the process of culturing a food product. The housing comprises a plurality of inlet holes, a plurality of outlet holes and a drip screen, wherein the drip screen is adapted to prevent condensation or any contaminants from dropping onto the container.

These and other aspects and advantages of the invention will become apparent from the following detailed description and the accompanying drawings which illustrate by way of example the features of the invention.

BRIEF DESCRIPTION OF THE DRAWINGS

FIG. 4a is a perspective view of internal components of an apparatus according to an embodiment of the invention.

FIG. 4b is a close-up view of the internal components shown in FIG. 4a.

DETAILED DESCRIPTION

The invention described herein is directed to different embodiments of an apparatus adapted to culture a plant material to produce a cultured food product, such as but not limited to tempeh. The apparatus can comprise many different materials and can be used in many different applications such as, but not limited to, small scale production of tempeh up to industrial scale production of tempeh. The apparatus according to the invention can be arranged in many different ways with many different components. In some embodiments, the apparatus can comprise a housing including an insulated chamber, a container adapted to receive the plant material, and at least one heating element. The apparatus further comprises a plurality of inlet holes and a plurality of outlet holes to allow air to flow through the housing. This arrangement allows air to be circulated within the housing using natural convection.

In one embodiment, as broadly described herein, an apparatus comprises a housing including an insulated chamber, a container received by the housing, and at least one heating element. The apparatus further comprises a plurality of inlet holes and a plurality of outlet holes, wherein air enters the insulated chamber through the plurality of inlet holes and air exits the insulated chamber through the plurality of outlet holes. The at least one heating element is configured to regulate and alter the temperature to ensure that the temperature inside the apparatus is at the desired level.

Culturing a plant material to make tempeh is generally known in the art. Conventional methods to make tempeh require the plant material, typically soybeans, to be soaked, dehulled, cooked and inoculated with a tempeh starter, such as portions of old tempeh and/or a mixture of molds, bacterial and other microorganisms. The soybean substrate is then incubated whereby the soybean substrate undergoes a culturing and fermentation process which produces the tempeh. The device typically used to hold the soybean substrate for the duration of the culturing process in convention methods are plastic storage bags or plastic film. The plastic bags also need to be perforated to allow excess gas to be released during the culturing process. The used plastic bags and plastic film are not reusable after the tempeh has been made, such that new plastic bag/film must be used each time tempeh is made. Furthermore, the production of the tempeh is limited to the size of the plastic bag/film, which could be a hindrance for making tempeh at a large or industrial scale. Other methods call for banana leaves or grape leaves to hold the soybean substrate for the duration of the culturing process. However, using leaves to wrap the soybean substrate is not always feasible, if not readily available, or for mass production of tempeh. Yet other devices used to hold the soybean substrate are stainless steel trays, as discussed above in U.S. Pat. No. 5,228,396 to Pfaff. However, the device in U.S. Pat. No. 5,228,396 to Pfaff, requires the stainless steel trays to be submerged in a water bath, due to the low thermal conductivity of stainless steel.

The apparatus of the invention can provide a number of advantages beyond those mentioned above. For example, in some embodiments the container section that holds the soybean substrate can be made of stainless steel and the apparatus is configured such that the soybean substrate can be properly cultured without having to submerge the container section in a water bath. This embodiment eliminates the need for the water bath, which can result in an ease of production of tempeh, as well as a reduction in cost in manufacturing tempeh. Additionally, in some embodiments, the apparatus is configured to be modular such that one apparatus can be stacked on top of and received by another apparatus. In other embodiments, the apparatus could be stacked with an external scaffolding, which would alleviate having to use extra heavy and strong materials.

The invention is described herein with reference to certain embodiments, but it is understood that the invention can be embodied in many different forms and should not be construed as limited to the embodiments set forth herein. In particular, the invention is described with reference to certain embodiments where the container is placed within or attached to a housing, but in other embodiments this configuration can be modified. The invention can also be used with different types of plant materials to make a cultured food product, and is not limited to a soybean substrate to make tempeh.

It is to be understood that when an element or component is referred to as being "on" another element or component, it can be directly on the other element or intervening elements may also be present. Furthermore, relative terms such as "between", "within", "adjacent", "below", "proximate" and similar terms, may be used herein to describe a relationship of one element or component to another. It is understood that these terms are intended to encompass different orientations of the device in addition to the orientation depicted in the figures.

Although the terms first, second, etc. may be used herein to describe various elements or components, these elements or components should not be limited by these terms. These terms are only used to distinguish one element or component from another. Thus, a first element discussed herein could be termed a second element without departing from the teachings of the present application. It is understood that actual systems or fixtures embodying the invention can be arranged in many different ways with many more features and elements beyond what is shown in the figures.

Embodiments of the invention are described herein with reference to illustrations that are schematic illustrations. As such, the actual thickness of elements and features can be different, and variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing. An element illustrated or described as square or rectangular will typically have rounded or curved features due to normal manufacturing tolerances. Thus, the elements illustrated in the figures are schematic in nature and their shapes are not intended to illustrate the precise shape of a feature of a device and are not intended to limit the scope of the invention.

With reference to FIGS. 1-4a, an exemplary apparatus 10 is shown. In some embodiments the apparatus 10 comprises a housing 12 including a top surface 14, a bottom surface 16 opposite the top surface 14, wherein the housing 12 is adapted to receive a container 31 comprising a base section 30 and a roof section 32. The base section 30 is adapted to hold a plant material to form a cultured food product. The apparatus 10 further comprises a plurality of inlet holes 36, a plurality of outlet holes 38 and at least one heating element 40. The plurality of inlet holes 36 are configured to allow air to flow into the housing 12, while the plurality of outlet holes 38 are configured to allow air to flow out of the housing 12.

The housing 12 further comprises a plurality of sidewalls 15 that are attached to the top surface 14 and bottom surface 16, such that the top surface 14 and bottom surface 16 are separated from each other by the plurality of sidewalls 15. In the embodiment shown in FIG. 1, the housing 12 is rectangular shaped, wherein one of the sidewalls 15 is configured to be an access panel 22 having an air-tight seal and allowing access to the interior of the housing 12. However in other embodiments the housing 12 can be in the form of different shapes, such as but not limited to, a quadrilateral, circular or triangular. In yet other embodiments, the top surface 14 and the bottom surface 16 of the housing 12 are hingedly attached to allow access to the interior of the housing 12. The housing 12 further comprises an upper section 24, a chamber 25 and a lower section 26. The upper section 24 comprises the plurality of sidewalls and the top surface 14. In some embodiments, the upper section 24 can be formed of an insulation material 28 so that the temperature inside the housing 12 can be adjusted or maintained at a desired temperature; the insulation material also prevents the loss of heat.

The lower section 26 of the housing 12 comprises the bottom surface 16 and the at least one heating element 40, such that the at least one heating element 40 is within the lower section 26 and extends along the length of the bottom surface 16, such that the at least one heating element 40 provides a uniform heat source to the lower section 26. In one embodiment, the lower section 26 comprises a plurality of heating elements 40 that are similar in size and shape and are equidistant from each other. The at least one heating element 40 can be configured in many different ways. For example, the lower section 26 can comprise a heating element 40 that extends along the perimeter of the bottom surface 16 in the form of a rectangle, and has one or more heating elements 40 extending along the length of the bottom surface 16. In yet other embodiments, the at least one heating element 40 can have many different configurations such as zigzag, serpentine, concentric, lattice, or the like. These are non-limiting examples of how the at least one heating element 40 can be configured and is not intended to be limited to the examples discussed herein.

The chamber 25 of the housing 12 is adapted to receive the container 31, such that the container 31 rests on the lower section 26 or a distance away from the lower section 26. In some embodiments, the chamber 25 comprises a support structure that receives the container 31 and is adapted to hold the container 31 within the chamber 25. For example, the support structure 44 can be comprised of slots 46 which are adapted to receive the container 31, such that the container 31 can slide into the slots 46 of the chamber 25. In other embodiments, the container 31 can have an extension extending about the perimeter of the container 31, wherein the extension is placed on the slots 46 within the chamber 25. In other embodiments, as in FIGS. 4a-4b, the support structure 44 is a separately formed frame 45 that receives the container 31, such that the frame 45 and container 31 can be placed into and removed from the chamber 25. This arrangement allows the frame 45 to be removed such that the chamber 25 can be easily cleaned due to the lack of obtrusions that could prevent proper cleaning of the chamber 25. In the embodiment shown in FIG. 4b, the separately formed structure is a frame 45 comprising a frame body 43 including at least one channel 47 and a plurality of support extensions 49 coupled to the frame body 43 such that the at least one channel 47 receives the container 31 such that the container can slide into the at least one channel 47. In the embodiment shown in FIG. 4b, the frame 45 comprises a plurality of channels 47 on opposite portions of the frame body 43, but the at least one channel 47 can be configured in many different ways. In yet other embodiments, the container extensions can be placed on the at least one channel 47.

The container 31 is configured to receive the plant material that is to be cultured to form the food product, such as but not limited to tempeh. The container 31 comprises a base section 30 and a roof section 32 opposite the base section 30. The base section 30 comprises a base floor 51 coupled to base sidewalls 53 and a base extension 48 coupled to the base sidewalls 53 opposite the base floor 51. The base extensions 48 extend substantially perpendicularly from the base sidewalls 53. The roof section 32 comprises a perforated top 34 coupled to roof sidewalls 35 and roof extensions 37 coupled to the roof sidewalls 35 opposite the perforated top 34. The roof extensions 37 extend substantially perpendicularly from the roof sidewalls 35. The base section 30 and the roof section 32 are two individual pieces that can be utilized together to form the container 31. In other embodiments, the base section 30 and the roof section 32 are similarly shaped, whereas in other embodiments, the base section 30 and roof section 32 are distinctly shaped.

The container 31 is configured such that the roof section 32 can be placed over the base section 30 in order to form an air-tight seal about the base extensions 48 and the roof extensions 37, such that the only airflow is through the perforated top 34 of the roof section 32. The air-tight seal prevents air from flowing in and/or out between the roof extensions 37 and base extensions 48. In some embodiments, a gasket can be used between the roof extensions 37 and base extensions 48, whereas in other embodiments, the support structure 44 or frame 45 that receives the container 31 can be configured to form the air-tight seal between the base section 30 and the roof section 32 by using a gasket or the like. In yet other embodiments, the base section 30 can be attached to the roof section 32 using a screw, rivet or the like to for the air-tight seal. An advantage of the invention is that by preventing airflow between the roof extensions 37 and base extensions 48, the only airflow would be through the perforated top 34 which preserves moisture needed for proper mycelium development during the culturing of the plant material. Failure of controlling the airflow within the chamber often leads to blackened areas on the cultured food product. The blackened areas are the result of air currents which cause the microorganisms to sporulate prematurely and produce undesirable black spores. The black spores are edible and do not negatively affect the cultured food product. Proper control of the air entering the container 31 prevents the formation of blackened areas on the cultured food product.

The container 31 can be configured in many different ways and is not intended to be limited to the embodiments discussed herein. For example, the base section 30 and the roof section 32 can be hingedly attached to one another. In yet another embodiment, the roof section 32 is comprised of the perforated top 34 and roof extensions 37 such that the perforated top 34 is a planar structure or substantially flat structure that is received by the support structure 44 or the frame 45. In other embodiments the planar roof section 32 could be mounted to the housing 12 within the chamber 25 such that the base section 30 aligns with the perforated top 34 inside the chamber 25. The container 31 and the interior of the housing 12 can be made of any food grade quality material known in the art, such as but not limited to stainless steel.

The at least one heating element 40 can be activated to heat the air inside the chamber 25 in order to culture the plant material, such as a soyfood substrate 50, in the base section 30. A first portion of the culturing process comprises an endothermic process, wherein the at least one heating element 40 heats the air within the chamber 25 of the housing 12. In some embodiments, the temperature within the chamber 25 is approximately 86-88° F. In the embodiment shown in FIG. 3, the apparatus comprises a plurality of heating elements 40 which form two heating zones, a first heating zone is comprised of the heating elements 40 within the bottom portion 26 of the housing and the second heating zone is comprised of the heating element 40 within the bottom portion 26 of the housing 12 and proximate the sidewalls 15. The first and second heating zones can be independently controlled by a control module 41. In such an embodiment, the first heating zone is configured to provide uniform heat underneath the base section 30 of the container 31. An example of the temperature underneath the base section 30 is 86-87° F. The second heating zone is configured to heat the air around the container 31 within the chamber 25. An example of the temperature around the container 31 within the chamber 25 is 88° F. However, the temperature provided by the first and second heat zones can be higher or lower than discussed herein. Additionally, the heating elements 40 of the first heating zone and second heating zone can be arranged in many different configurations as discussed herein. The apparatus can also be configured to have a plurality of heating zones.

A second portion of the culturing process comprises an exothermic process, wherein the soyfood substrate 50 generates heat and releases the generated heat into the chamber 25 of the housing 12. In order to ensure proper temperature settings within the chamber 25, the apparatus 10 can comprise a control module 41. The control module 41 is configured to detect the temperature inside the housing 12 and can control the at least one heating element 40 so as to adjust the heat output of the at least one heating element 40 in order to maintain the temperature inside the housing 12 at a predetermined temperature during the culturing process. For example, during the exothermic portion of the culturing process, the control module 41 could reduce the heat output or deactivate the at least one heating element 40 due to the soyfood substrate 50 generating heat. In embodiments comprising heating zones, the control module 41 can independently control the heat output of the respective heating zones. The apparatus 10 can further comprise a fan 42 which can also be activated by the control module 41 so as to reduce or maintain the temperature of the soyfood substrate 50 and/or the temperature inside the housing 12. Air that is blown by fan 42 can be expelled out of the lower portion 26 of the housing 12 through at least one fan exhaust 54. In some embodiments, the activation of the fan 42 and/or adjustment of the heat output of the at least one heating element 40 can be done manually, whereas in other embodiments the fan 42 and at least one heating element 40 are automatically controlled.

In order to provide the proper atmosphere for the culturing process, fresh air will be allowed to enter the apparatus 10. The housing 12 comprises a plurality of air inlet holes 36 disposed on opposing sidewalls 15 of the housing 12 and are proximate the bottom surface 16 of the housing 12. Air will also be allowed to exit the apparatus through natural convection via a plurality of air outlet holes 38 disposed on opposing sidewalls 15 of the housing, wherein the plurality of air outlet holes 38 are disposed on opposing sidewalls 15 which do not already have air inlet holes 36. The plurality of air outlet holes 38 are proximate the top surface 14 of the housing and can be configured such that the air outlet holes 38 form an angled channel, such that the channel opening inside the housing 12 is at a lower position than the channel opening at the sidewall 15 of the housing. An advantage of the invention is that the angled channel takes advantage of natural convection to allow heated air from exiting the housing 12. In other embodiments, the inlet holes 36 and/or outlet holes 38 can be configured such that they are substantially perpendicular to the sidewalls 15, angled or a combination thereof. In yet other embodiments, the inlet holes 36 and outlet holes 38 can be disposed on the same sidewalls 15.

During the culturing process, condensation may form within the housing 12 and in particular in the vicinity of the plurality of the air outlet holes 38 and/or on the upper surface of the housing. A collection of condensation within the housing 12 could collect on the upper surface 55 of the chamber and could cause water drops to fall onto the soyfood substrate 50 within the container 31. Water that comes into contact with the soyfood substrate 50 during the culturing process could negatively impact the soyfood substrate 50 and even kill the beneficial microorganism that is added to the soyfood substrate 50, thereby hindering or stopping the development of the tempeh. In order to prevent water from coming into contact with the soyfood substrate 50, the housing 12 can comprise a drip screen 52 adjacent the upper surface 55 of the chamber 25, wherein the drip screen 52 catches any condensation that may drop from within the chamber 25 and/or the plurality of air outlet holes 38. In yet another embodiment, the drip screen 52 can be adapted to guide the received condensation away from the perforated top 34 of the container 31 and/or discard the received condensation. The drip screen 52 can be shaped such that the received condensation flows towards the chamber sidewalls 57 so that the condensation can trickle down the chamber sidewalls 57 towards the chamber floor 59. The upper surface 55 of the chamber 25 can have a curved shape to direct condensation towards the chamber sidewalls 57. The upper surface 55 can be arranged in many different shapes and is not intended to be limited to a curved shape. An advantage of the invention is that the condensation collected on the chamber floor 59 assists in maintaining the proper humidity levels inside the housing 12.

The control module 41, upon determination that the culturing process is complete, can be configured to activate the at least one heating element 40 so as to pasteurize the cultured food product. In some embodiments, the temperature used to pasteurize the cultured food product is 160° F., thereby killing the beneficial microorganism added to the soyfood substrate 50. In some embodiments, pasteurizing the cultured food product could be done automatically, whereas in other embodiments the at least one heating element 40 can be manually activated. The automation of the apparatus 10 can be governed by a number of factors such as but not limited to temperature, humidity, time and/or a combination thereof. In some embodiments, a period of elapsed time could trigger an automated event such as turning off the at least one heating element 40 to coincide with the endothermic portion of the culturing process. In yet other embodiments, the control module 41 further monitors conditions within the housing 12 to ensure that the triggered event properly occurs due to the elapsed period of time.

Figure 1:
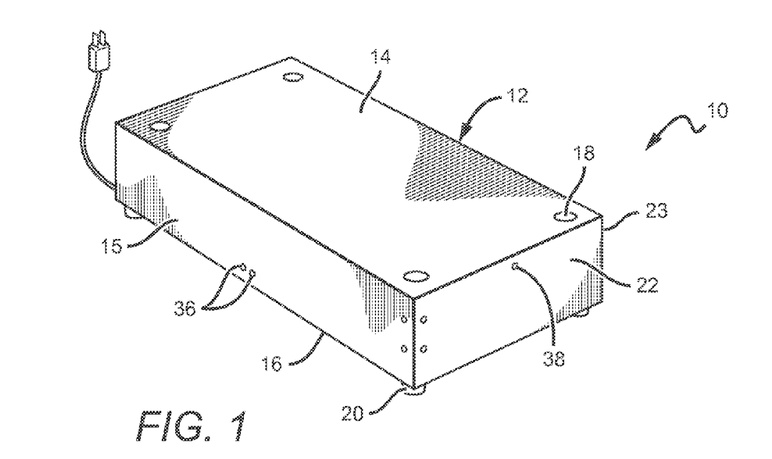
FIG. 1 is a perspective view of an apparatus according to an embodiment of the invention.
Figure 2:
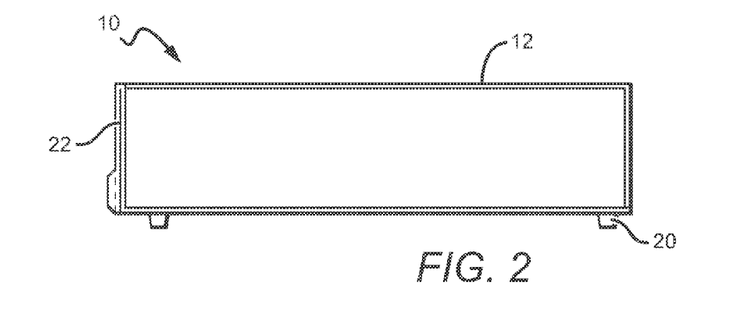
FIG. 2 is a side view of the apparatus shown in FIG. 1.
Figure 3:
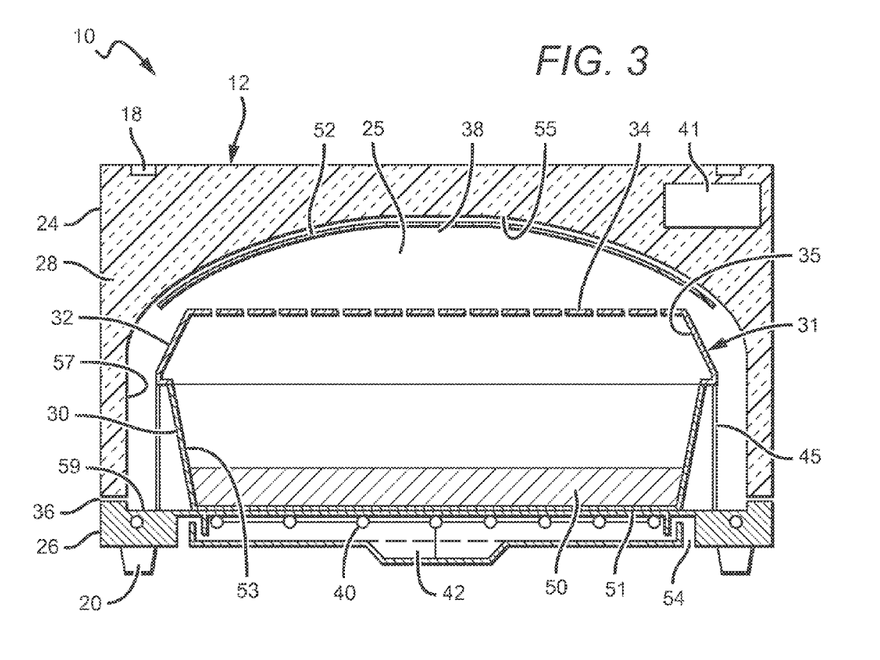
FIG. 3 is a cross-sectional view of the apparatus shown in FIG. 1.
Figures 4A, 4B:
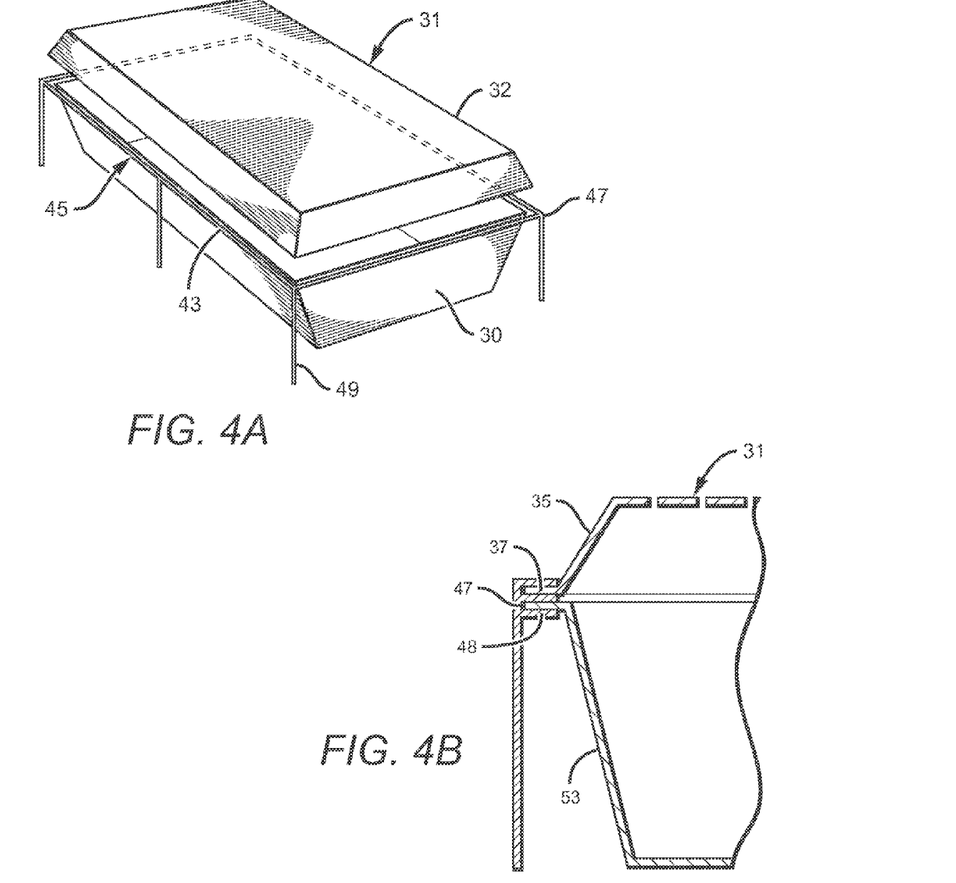
Figure 5:
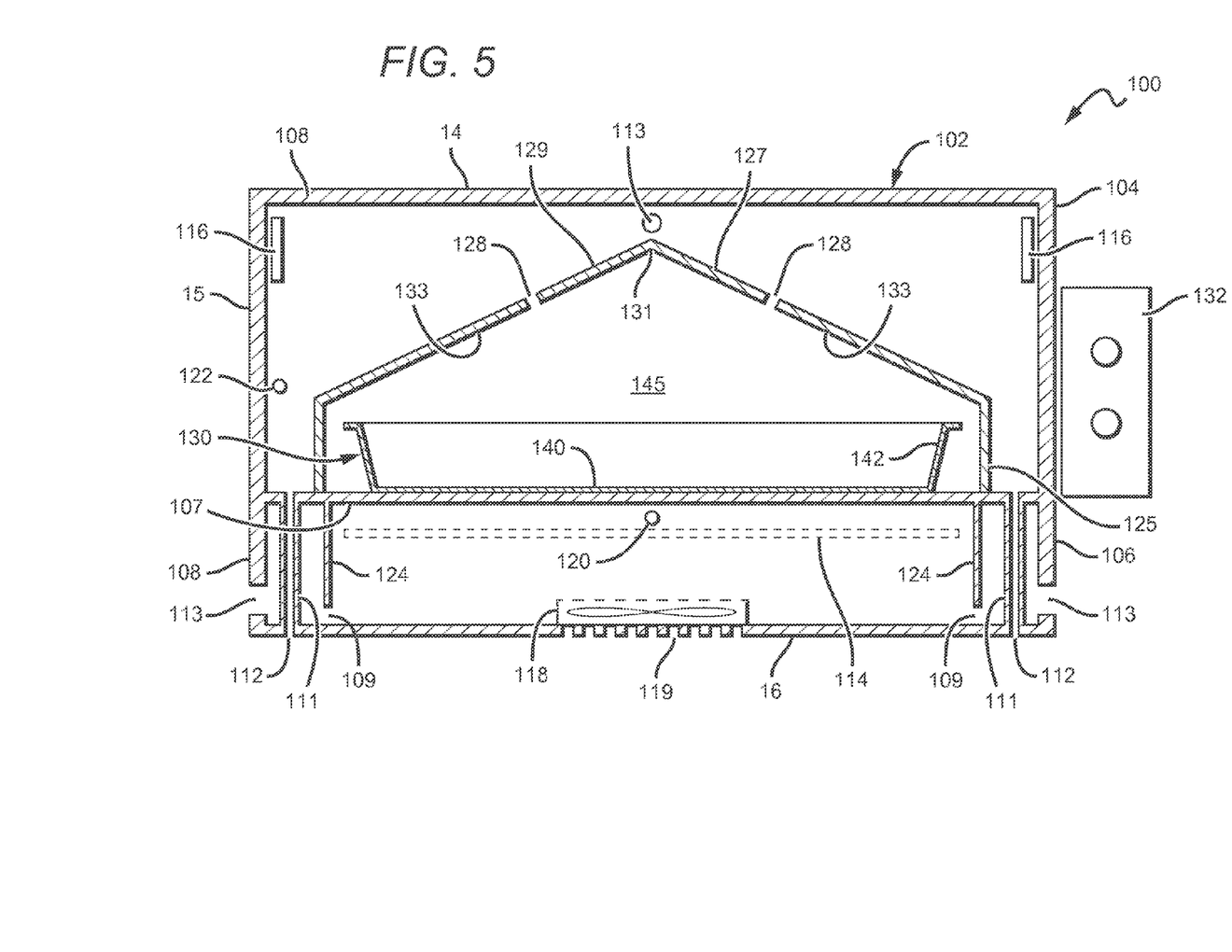
FIG. 5 is a cross-sectional view of an apparatus according to an embodiment of the invention.

FIG. 5 discloses another embodiment of an apparatus 100. For the same or similar features, the same reference numbers will be used throughout the application herein. FIG. 5 shows an apparatus 100 that is also adapted to prepare a cultured food product, similarly as discussed above. The apparatus 100 comprises a housing 102 comprising a top surface 14, a bottom surface 16 opposite the top surface 14, wherein the housing 102 is adapted to receive a container 130. The container 130 is adapted to hold a plant material to form a cultured food product, similarly as described above. The apparatus 100 further comprises at least one inlet hole 112 and at least one outlet hole 113. The at least one inlet hole 112 is configured to allow air to flow into the housing 102 and the at least one outlet hole 113 is configured to allow air to flow out of the housing 102.

The housing 102 further comprises a plurality of sidewalls 15 that are attached to the top surface 14 and bottom surface 16, such that the top surface and bottom surface are separated from each other by the plurality of sidewalls. The apparatus 100 is configured such that at least one of the plurality of sidewalls 15 is configured to be an access panel 22 providing access to the interior of the housing 102, similarly as discussed above. The plurality of sidewalls 15 are thermally insulated with an insulation 108 to maintain the temperature at a constant setting within the housing. The insulation 108 can be thermally insulating material known in the art. In some embodiments, at least one of the sidewalls 15 is hingedly attached to at least one adjacent sidewall 15 and/or the top surface 14 and bottom surface 16 to form the access panel 22, such that the access panel pivots about a pivot point to provide access to the interior of the housing 102. However, the access panel can be configured in many different ways, and the invention is not intended to be limited to an access panel 22 pivoting about a pivot point. The access panel allows access to the interior of the housing 102, and also provides an air-tight seal when closed.

Figure 7:
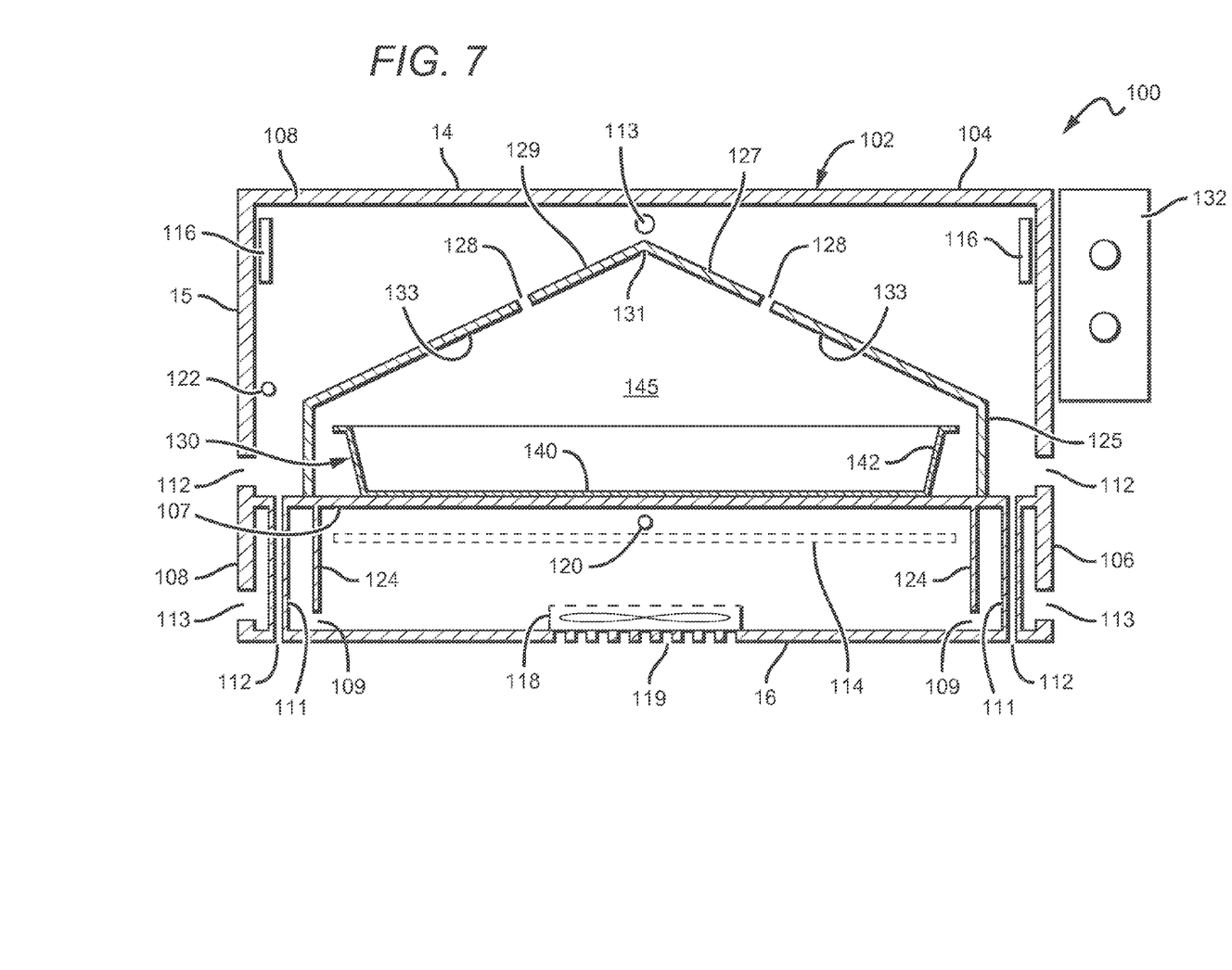
FIG. 7 is a cross-sectional view of an apparatus according to an embodiment of the invention.

The housing 102 further comprises an upper section 104 and a lower section 106. The lower section 106 of the housing 102 comprises at least one inlet hole 112, at least one outlet hole 113, at least one bottom heater 114 and a fan 118. The at least one inlet hole 112 allows ambient air to enter the housing 102 and is circulated within the housing 102. In one embodiment of the invention, the lower section 106 comprises a plurality of inlet holes 112. The at least one inlet hole 112 where the air is channeled to the central surface 107 of the housing 102. As shown in FIG. 5, the at least one inlet hole 112 is connected to a conduit 111 that allows ambient air to enter the upper section 104. This configuration prevents the air within the lower section 106 to be mixed with the ambient air that is routed to the upper section 104. In another embodiment, the air that is allowed to enter the housing 102 from the sides through the air inlet hole 112 at the level of the central surface 107 and the air will be allowed to naturally mix with warmer air, provide oxygen for the plant material and eventually exit the housing 102 at the at least one outlet hole 113. An exemplary configuration of the apparatus 100, as shown in FIG. 7, comprises at least one inlet hole 112 in the middle of the sidewalls 15 of the housing 102 and exit the housing 102 at the top surface 14 through outlet holes 113 disposed proximate to opposing sidewalls 15.

The fan 118 is adapted to circulate air within the lower section 106. The fan 118 comprises at least one fan inlet holes 119 that allows the fan 118 to blow in ambient air when the fan 118 is activated. The fan 118 can be activated by a control module 132 so as to reduce or maintain the temperature within the lower section 106. Air within the lower section 106 can be expelled out the at least one outlet hole 113. In one embodiment, the at least one outlet hole 113 is disposed at a sidewall 15. In other embodiments, the housing comprises a plurality of outlet holes 113, wherein the outlet holes 113 are disposed on opposing sidewalls 15. In yet other embodiments, the outlet holes 113 can be disposed on adjacent sidewalls 15, or on the same sidewall 15. The invention can be arranged in many different configurations and is not intended to be limited to the embodiments disclosed herein. The at least one outlet hole 113 allows the air within the lower section 106 to be expelled as required. However, when the fan 118 is not activated, it is possible for air to enter the lower section 106 via the at least one fan inlet hole 119 and/or the at least one outlet hole 113.

The at least one bottom heater 114 in the lower section 106 of the housing is configured to regulate and alter the temperature within the lower section 106 to ensure that the temperature inside the housing 102 is at a desired level. The at least one bottom heater 114 can be configured similarly to the at least one heating element 40, discussed above. In some embodiments, the at least one bottom heater 114 is within the lower section 106 and substantially extends along the length of the bottom surface 16, such that the at least one bottom heater 114 is adapted to provide a uniform heat source to the lower section 106. In other embodiments, the lower section 106 can comprise a plurality of bottom heaters 114.

The lower section 106 further comprises at least one baffle 124 to assist in the air circulation within the lower section 106. The baffle 124 promotes the retaining of air within the lower section 106 to ensure that heat within the lower section is substantially uniform and that the lower section 106 does not have hot spots and/or cold spots, and that the warm air within the lower section does not escape. In one embodiment, the baffle 124 is proximate the at least one bottom heater 114 and the conduit 111. In this arrangement, the baffle 124 is coupled to a central surface 107 such that the baffle extends from the central surface 107 towards the bottom surface 16, but does not contact the bottom surface and forms a gap 109 between the baffle and the bottom surface 16 so that air within the lower section 106 can pass through the gap 109 and exit out the lower section 106 through the at least one outlet hole 113. The baffle 124 can also extend along the central surface 107 along the perimeter of the lower portion 106 and can be arranged to be substantially parallel to the sidewalls 15, such that the baffle 124 has a shape similar to the shape of the housing 102 formed by the sidewalls 15. The baffle 124 can be arranged in many different configurations and is not intended to be limited to the example disclosed herein. In other embodiments, the baffle 124 can extend from and along the central surface 107 while having a different shape than that of the housing 102. While in other embodiments, the baffle can extend along part of the central surface 107. In yet other embodiments, the baffle can extend along part of the central surface proximate opposing sidewalls 15, such that the baffle comprises opposing baffles that are proximate opposing sidewalls. The fan 118 could also be located in other places, for example on an external surface of a sidewall 15 and be arranged so that the fan blows through the lower section 106 to exhaust at the at least one outlet hole 113 in the lower section.

The lower section 106 further comprises a thermocouple 120. Thermocouples are known in the art and are briefly discussed herein. The thermocouple 120 measures the temperature of the lower section 106 and relays the measurements to a control module 132. The control module 132 monitors conditions within the housing 102 to ensure that optimal and/or desired conditions occur to properly culture the food product within the housing 102. Measurements from the thermocouple 120 to the control module 132 assist in allowing the control module to independently control the heat output of the at least one bottom heater 114 and/or the operation of the fan 118 in order to provide the desired temperature within the lower section 106. As shown in FIG. 5, the thermocouple 120 is within the lower section 106 and proximate the central surface 107. However, the thermocouple 120 can be located in different locations within the lower section 106 and is not intended to be limited to the example discussed herein. In other embodiments, the thermocouple could also be disposed within a chamber 145, discussed below, so that measurements of the temperature within the chamber 145 and/or of the plant material can be provided to the control module 132. Furthermore, the invention is not limited to utilizing thermocouples. In other embodiments, an infrared probe and/or other sensors, in addition to and/or in place of thermocouples, can be used.

Figure 8A:
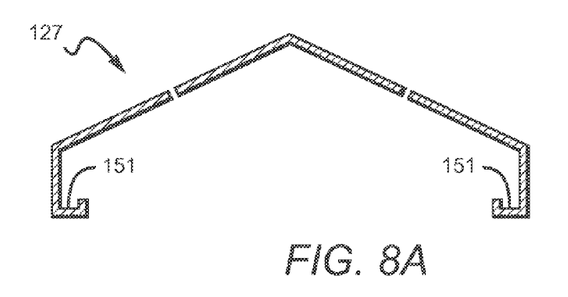
FIG. 8a is a perspective view of an embodiment of an enclosure according to an embodiment of the invention.
Figure 8B:
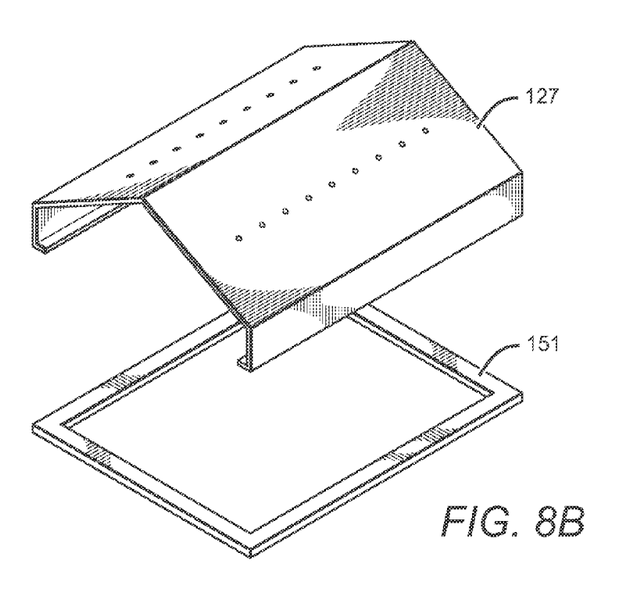
FIG. 8b is a perspective view of an embodiment of an enclosure according to an embodiment of the invention.

The upper section 104 of the housing 102 comprises at least one upper heater 116, at least one upper outlet 113, and an enclosure 127. The enclosure 127 is on the central surface 107 which separates the upper section 104 and the lower section 106. The enclosure 127 comprises at least one enclosure sidewall 125, an enclosure roof 129, at least one perforation 128 and a ridge 131. In the embodiment of FIG. 5, the enclosure 127 comprises two enclosure sidewalls 125 that extend from the central surface 107. The enclosure roof 129 comprises two inclined surfaces 133 coupled to a respective enclosure sidewall 125 at one end, the inclined surfaces 133 are coupled to each other opposite the enclosure sidewalls 125 which forms a ridge 131. The enclosure roof 129 and enclosure sidewalls 125 of the enclosure are configured in an A-frame configuration. In other embodiments, the enclosure 127 can be configured to have many different shapes and is not intended to be limited to an A-frame configuration. In other embodiments, the enclosure roof 129 can be a multi-faceted surface(s), comprise one or a plurality of inclined surfaces, or comprise one or more curved surfaces, or a combination thereof. The enclosure 127 runs along the length of the central surface 107 from the sidewall 15 of the housing 102 configured to be the access panel 22 towards the sidewall 15 opposing the access panel. The enclosure 127 forms a chamber 145 that is adapted to receive a container 130 such that the container rests on the central surface 107 and is enclosed within the enclosure 127. When the access panel 22 of the housing 102 is closed, the access panel 22 and the sidewall 15 opposing the access panel 22 contact the enclosure 127 to form the chamber 145. The chamber 145 is arranged to be substantially air-tight, and is arranged as such to control the air that enters the chamber 145. In other embodiments, the enclosure 127 can be configured to have one or both of its ends closed, while yet still being adapted to receive the container 140. For example, the enclosure 127 could be lifted within the upper section 104 in order to receive and/or provide access the container 140. In yet other embodiments, as shown in FIGS. 8a-8b, the enclosure 127 could comprise a U-shaped trench 151 proximate the sidewalls 125 in order to collect condensation. The trench 151 could be part of the enclosure 127 or it can be a separate structure.

Figure 6:
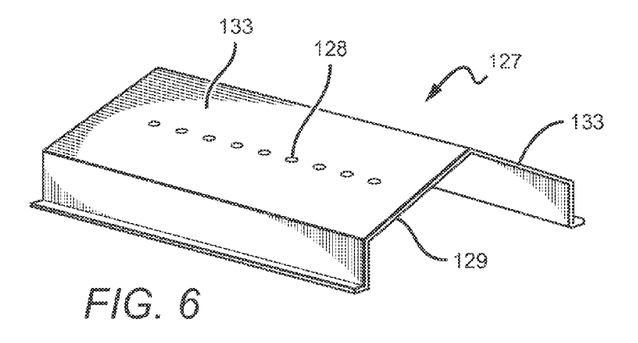
FIG. 6 is a perspective view of an enclosure of the apparatus shown in FIG. 5.

The enclosure 127 comprises at least one perforation 128 on each of the inclined surfaces 133 of the enclosure roof 129. FIG. 6 shows an embodiment of an enclosure 127 comprising a plurality of perforations 128 on each of the inclined surfaces 133 of the enclosure roof 129. The perforations 128 allow air to enter and exit from the enclosure 127. The perforations 128 are the only channels that allow air to enter and exit from the enclosure 127, which ensures that the desired environment is present in the enclosure. The perforations 128 allow for proper aeration of the food product during the culturing process.

In the embodiment shown in FIGS. 5 and 6, the perforations 128 are disposed approximately 4 inches from the ridge 131. However in other embodiments, the perforations 128 can be disposed at any distance from the ridge 131 and do not all have to be equidistant from the ridge. In other embodiments, the perforations 128 can all be at different distances from the ridge 131. The enclosure 127 can be formed of multiple parts that are coupled together. In other embodiments, the enclosure 127 can be formed of one piece of material that is molded into the A-frame shape shown in FIGS. 5 and 6.

At least one advantage of the invention is that the A-frame shape of the enclosure 127 allows condensation to run off the inclined surfaces 133 of the enclosure roof 129 and/or the enclosure sidewalls 125. The configuration of the enclosure 127 substantially prevents condensation from contacting the food product during the culturing process, which could introduce contaminants to the food product during the culturing process.

The at least one upper heater 116 is within the upper section 104 but external to the enclosure 127. In the embodiment of FIG. 5, the apparatus 100 comprises two upper heaters 116 in the upper section 104. However, in other embodiments, the apparatus can comprise more than two upper heaters 116. The at least one upper heater 116 is configured to regulate and alter the temperature within the upper section 104 to ensure that the temperature inside the housing 102 is at a desired level. The at least one upper heater 116 can be configured similarly to the at least one heating element 40 and the at least one bottom heater 114 discussed above. In some embodiments, the at least one upper heater 116 is within the upper section 104 and substantially extends along the length of a sidewall 15, such that the at least upper heater is adapted to provide a uniform heat source to the upper section 104.

The at least one upper outlet 113 is arranged to allow air within the upper section 104 to exit out of the housing 102 through natural convection. The at least one upper outlet 113 is disposed on opposing sidewalls 15 of the housing 102. In the embodiment of FIG. 5, the apparatus 100 comprises two upper outlets 113, with one disposed on the access panel 22 (not shown) and the other on the sidewall 15 that is opposite the access panel. In the embodiment of FIGS. 5 and 7, the location of where the upper outlet 113 disposed on the access panel 22 is shown, but the access panel is not shown because FIGS. 5 and 7 are cross-sectional views of the respective apparatus. The invention is not intended to be limited to the embodiments disclosed herein. In other embodiments, the apparatus 100 can comprise more than two upper outlets 113 and can be on any of the sidewalls 15 or on the upper surface 14 of the housing 102. The at least one upper outlet 113 can be configured in a manner similar to the air outlet holes 38 discussed above.

The upper section 104 further comprises a thermocouple 122, which is similar to the thermocouple 120 in the lower section 106. The thermocouple 122 measures the temperature of the upper section 104 and relays the measurements to the control module 132. The control module 132 monitors conditions within the housing 102 to ensure that optimal and/or desired conditions occur to properly culture the food product within the housing 102. Measurements from the thermocouple 122 to the control module 132 assist in allowing the control module to independently control the heat output of the at least one upper heater 116 in order to provide the desired temperature within the upper section 104. As shown in FIG. 5, the thermocouple 122 is within the upper section 104 and proximate to sidewall 15. However, the thermocouple 122 can be located in different locations within the upper section 104 and is not intended to be limited to the example discussed herein. Ambient air enters the upper section 104 of the housing 102 through the at least one inlet hole 112 wherein the ambient air flows in to the upper section 104. This air is then heated, as necessary, by the at least one upper heater 116. The control module 132 is configured to independently control the operation of the at least one upper heater 116 to ensure that the desired temperature is present in the upper section 104.

The chamber 145 is adapted to receive a container 130 wherein the container rests on the central surface 107 and is enclosed within the enclosure 127. The container 130 comprises a base floor 140 and container sidewalls 142. The container 130 is similar to the container 31 discussed above, in that the container 130 receives the plant material that is to be cultured to form the food product, such as but not limited to tempeh. The container 130 is adapted to be removable from the chamber 145 by opening the access panel 22 of the housing 102.

The apparatus 100 operates similarly as the apparatus 10, in that the at least one bottom heater 114 and at least one upper heater 116 can be activated to heat the air inside the respective lower and upper sections 106, 104 in order to culture the plant material in the container 130. A first portion of the culturing process comprises an endothermic process, wherein the at least one upper heater and at least one bottom heater heat the air within their respective sections of the housing 102. In some embodiments, the temperature within the upper and lower sections 104, 106 can be approximately 86-90° F. In the embodiment shown in FIG. 5, the apparatus comprises a plurality of upper heaters 116 and a bottom heater 114 which forms two heating zones, a first heating zone is comprised of the upper heaters 116 within the upper section 104 of the housing 102 and the second heating zone is comprised of the bottom heater 114 within the lower section 106 of the housing 102. The first and second heating zones can be independently controlled by the control module 132. In such an embodiment, the second heating zone is configured to provide uniform heat underneath the base section 140 of the container 130. An example of the temperature underneath the base section 140 can be approximately 86-90° F. The first heating zone is configured to heat the air within the upper section 104, wherein this heated air enters the chamber 145 through the at least one perforation 128 of the enclosure 127. An example of the temperature around the container 130 within the chamber 145 is approximately 88° F. However, the temperature provided by the first and second heat zones can be higher or lower than discussed herein. Additionally, the at least one upper heater 116 and the at least one bottom heater 114 of the first heating zone and second heating zone can be arranged in many different configurations as discussed herein.

A second portion of the culturing process comprises an exothermic process, wherein the plant material generates heat and releases the generated heat into the chamber 145. In order to ensure proper temperature settings within the chamber 145, the control module 132 is configured to detect the temperature inside the housing 102 and can control the at least one upper and bottom heaters 116, 114 so as to adjust the heat output of the upper and/or bottom heaters in order to maintain the temperature inside the housing 102 at a predetermined temperature during the culturing process. For example, during the exothermic portion of the culturing process, the control module 132 could reduce the heat output or deactivate either or both of the upper and/or bottom heaters due to the plant material generating heat. In embodiments comprising heating zones, the control module 132 can independently control the heat output of the respective heating zones. The fan 118 can also be activated by the control module 132 so as to reduce or maintain the temperature of the plant material and/or the temperature inside the housing 102. Air that is blown by fan 118 can be expelled out of the lower section 106 of the housing 102 through the at least one outlet 113. In some embodiments, the activation of the fan 118 and/or adjustment of the heat output of the at least one upper and/or bottom heaters 116, 114 can be done manually, whereas in other embodiments the fan 118 and the at least one upper and/or bottom heaters 116, 114 are automatically controlled.

The control module 132, upon determination that the culturing process is complete, can be configured to activate the at least one upper and/or bottom heaters 116, 114 so as to pasteurize the cultured food product. In some embodiments, the temperature used to pasteurize the cultured food product is 160° F., thereby killing the beneficial microorganism added to the plant material. In some embodiments, pasteurizing the cultured food product could be done automatically, whereas in other embodiments the at least one upper and/or bottom heaters 116, 114 can be manually activated. The automation of the apparatus 100 can be governed by a number of factors such as but not limited to temperature, humidity, time and/or a combination thereof. In some embodiments, a period of elapsed time could trigger an automated event such as turning off the at least one upper and/or bottom heaters 116, 114 to coincide with the endothermic portion of the culturing process. In yet other embodiments, the control module 132 further monitors conditions within the housing 102 to ensure that the triggered event properly occurs due to the elapsed period of time. The control module could be configured in many different ways and is not intended to be limited to the embodiments disclosed herein. In some embodiments, the control module 132 could be a structure separate from the apparatus 100 that is electrically connected to the apparatus. In yet other embodiments, the control module 132 could be arranged to be electrically connected to a plurality of apparatuses 100 that can be operated simultaneously or independently.

The invention is described herein with reference to certain embodiments, but it is understood that the invention can be embodied in many different forms and should not be construed as limited to the embodiments set forth herein. For example, the embodiments herein disclose an individual apparatus for culturing a soyfood substrate. However, a plurality of apparatuses mounted one above the other or side-by-side in a spatial relationship can be used. The housing can comprise a plurality of extensions coupled to the lower section of the housing and are configured to be received by a respective one of a plurality of depressions on the top surface of the housing. In this manner, a soyfood substrate can be cultured on an industrial scale. In yet other embodiments, the heat within the apparatus can be regulated by a single heating element. Yet further, the heating element can be an electric heating coil or the like. Also, other beneficial microorganisms can be used other than a fungus of the genus *Rhizopus*. While various implementations of the application have been described, it will be apparent to those of ordinary skill in the art that many more embodiments and implementations are possible that are within the scope of this invention.

I claim:

1. An apparatus, comprising:
   a housing including a plurality of sidewalls, an upper section, a lower section, and a central surface, wherein said central surface separates said upper section and lower section;
   an enclosure within said upper section comprising enclosure sidewalls and an enclosure roof, wherein said enclosure roof comprises at least one perforation;
   at least one upper heater within said upper section;
   at least one bottom heater within said lower section; and
   said housing comprising at least one inlet hole and at least one outlet hole for each of said upper section and said lower section, wherein said at least one inlet hole of said upper section is adapted to allow air to only enter said upper section of said housing and said at least one outlet hole of said upper section is adapted to only allow air within said upper section to exit said upper section of said housing, wherein air in each of said upper and lower sections is separated by said central surface such that air in said upper section only circulates within said upper section, and air in said lower section only circulates within said lower section, such that air within said upper section does not mix with air within said lower section within said housing.

2. The apparatus of claim 1, wherein said enclosure forms a chamber within said upper section of said housing.

3. The apparatus of claim 2, wherein said enclosure is adapted to receive a container.

4. The apparatus of claim 2, wherein said container is disposed on said central surface.

5. The apparatus of claim 1, wherein said at least one bottom heater is adapted to provide uniform heat to said lower section of said housing.

6. The apparatus of claim 1, wherein said at least one upper heater is adapted to provide uniform heat to said upper section of said housing.

7. The apparatus of claim 2, wherein said at least one upper heater heats air within said chamber proximate said container.

8. The apparatus of claim 1, wherein the air entering said housing through said at least one inlet hole is ambient air and the air exiting said housing through said at least one outlet hole is heated air.

9. The apparatus of claim 1, wherein said enclosure roof comprises inclined surfaces such that condensation is allowed to run off said enclosure roof and said enclosure sidewalls.

10. The apparatus of claim 1, said housing comprising an access panel to allow access to the interior of said upper section of said housing.

11. The apparatus of claim 10, wherein one of said plurality of sidewalls is configured to comprise said access panel.

12. The apparatus of claim 1, further comprising:
    a fan; and
    a control module.

13. The apparatus of claim 12, wherein said control module is adapted to detect the temperature within said housing, wherein said control module regulates the temperature within said housing at a desired setting.

14. The apparatus of claim 13, wherein said control module can adjust the heat output of said at least one upper heater and/or said at least one bottom heater in response to the temperature inside said housing.

15. The apparatus of claim 12, wherein said fan is adapted to be activated to maintain or lower the temperature within said housing.

16. The apparatus of claim 12, wherein said fan is adapted to be activated to maintain or lower the temperature of a container within said enclosure.

17. The apparatus of claim 1, wherein said housing is thermally insulated to maintain the temperature at a constant setting within said housing.

18. The apparatus of claim 1, wherein said at least one upper heater is configured to form a first heating zone and said at least one bottom heater is configured to form a second heating zone.

19. The apparatus of claim 18, wherein said first heating zone is adapted to provide uniform heat to said upper section of said housing, and said second heating zone is adapted to provide uniform heat to said lower section of said housing.

20. The apparatus of claim 1, wherein said housing comprises at least one inlet hole for said upper section at a bottom surface of said housing connected to a respective conduit that extends from said bottom surface through said lower section to said central surface in order to allow air to enter said upper section.

* * * * *